United States Patent

[11] 3,599,354

[72] Inventor Winston C. Larson
 1117 Minnesota Ave., Detroit Lakes, Minn. 56501
[21] Appl. No. 768,866
[22] Filed Oct. 18, 1968
[45] Patented Aug. 17, 1971

[54] APPARATUS FOR REMOVING WEEDS FROM SOIL UNDER WATER
 1 Claim, 3 Drawing Figs.
[52] U.S. Cl. ................................. 37/78, 56/8
[51] Int. Cl. .................................. E02f 5/28
[50] Field of Search ............................. 37/54, 78, 62, 63, 67; 56/8, 9

[56] References Cited
UNITED STATES PATENTS

| | | | |
|---|---|---|---|
| 95,213 | 9/1869 | Elliott | 37/78 |
| 301,682 | 7/1884 | Coiseav | 37/78 |
| 1,180,664 | 4/1916 | Littlehales | 37/62 |
| 1,268,387 | 6/1918 | Reed | 37/78 |
| 1,619,850 | 3/1927 | Casey | 37/67 |
| 2,318,587 | 5/1943 | Andrews, Jr. | 37/78 |
| 2,597,131 | 5/1952 | Sempos | 56/8 |
| 2,852,868 | 9/1958 | Talbott et al. | 37/78 |
| 3,019,535 | 2/1962 | Talbott et al. | 37/78 |
| 3,295,231 | 1/1967 | Talbott | 37/78 |
| 3,402,487 | 2/1968 | Vaughan et al. | 37/78 |

Primary Examiner—Robert E. Pulfrey
Assistant Examiner—Clifford D. Crowder
Attorney—Schroeder, Siegfried & Ryan ABSTRACT: An apparatus for removing weed growth from soil under water through the use of hydrojet action. The apparatus employs a jet tube assembly with spaced jets along the extent of the same which provides a sweeping action to remove soil from around the roots of weeds for the purpose of removing weeds form the bottom It employs a floatable platform to which the jet assembly is attached with the jet assembly being pivoted on the platform which mounts a motor-driven jet assembly being pivoted on the platform and forcing it through the jet assembly under high pressures. The jet assembly is adjustable relative to the soil surface to insure proper cleaning operation.

PATENTED AUG 17 1971

3,599,354

INVENTOR.
WINSTON C. LARSON
BY
Schroeder, Siegfried & Ryan
ATTORNEYS

APPARATUS FOR REMOVING WEEDS FROM SOIL UNDER WATER

My invention relates to apparatus for removing aquatic growth or weeds from the bottom or soil under water such as in the shorelines of lakes, rivers, etc., and more particularly to an improved apparatus of this type which removes the growth through the use of a hydrojet action by the removal of soil from around the roots of the growth.

Apparatus of this general type has been employed in the field of seaweed removal. These prior apparatus have employed complicated barge and jet structures which make them difficult and expensive to use and which, because of the individual jet arrangements, were unable to effectively deweed or remove growth over an entire bottom area for proper cleaning purposes.

The present invention is directed to an improved and self-contained apparatus of this type which employs a simplified jet assembly structure to provide effective coverage of the soil or ground to complete weed removal and which is simple to use and maintain. This improved apparatus permits adjustment of depth of the jet assembly, which is a single horizontally positioned pipe with slot-type jet openings therein, for effective and complete line coverage of a bottom with the jet assembly being held at a fixed and predetermined spacing from the platform through supporting skids such that effective cleaning is obtained. In addition, the slotted openings in the jet assembly are adjustably positioned or angled relative to the ground surface for maximum and efficient weed removal by erosion of the soil around plants to release root systems such that the plants may float to the surface for complete weed removal. This improved apparatus employs a self-contained floating platform which mounts a motor and pump and to which the jet assembly is attached and upon which the jet assembly is pivotally mounted with means for pivoting the jet assembly relative to the platform such that a uniform spacing is always obtained between the jet assembly and the ground during cleaning operation. Further, it is adjustable for varying depths of water to provide for improved and complete beach cleaning.

Therefore, it is the principal object of this invention to provide an improved apparatus for the removal of weeds or growth from the soil underneath water at varying depth levels.

Another object of this invention is to provide apparatus of this type which is adjustable for efficient cleaning and which will clean along a complete line or area through the use of a simplified jet assembly.

Another object of this invention is to provide an improved jet assembly for apparatus of this type which is adjustable relative to supporting skids for maximum efficient angle of hydrojet action in a cleaning operation.

A still further object of this invention is to provide a simplified apparatus of this type which is easy to use and maintain.

These and other objects of this invention will become apparent from a reading of the attached description together with the drawings, wherein.

Figure 1:
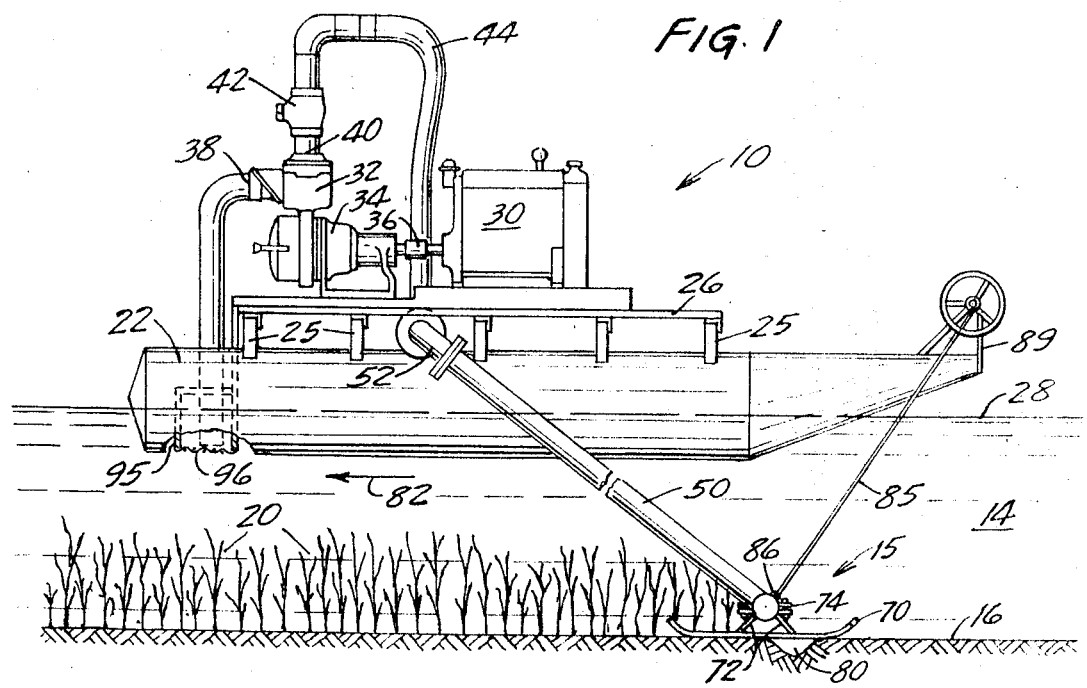
FIG. 1 is a side elevation view of an improved apparatus for removing weeds from soil under water.
Figure 2:
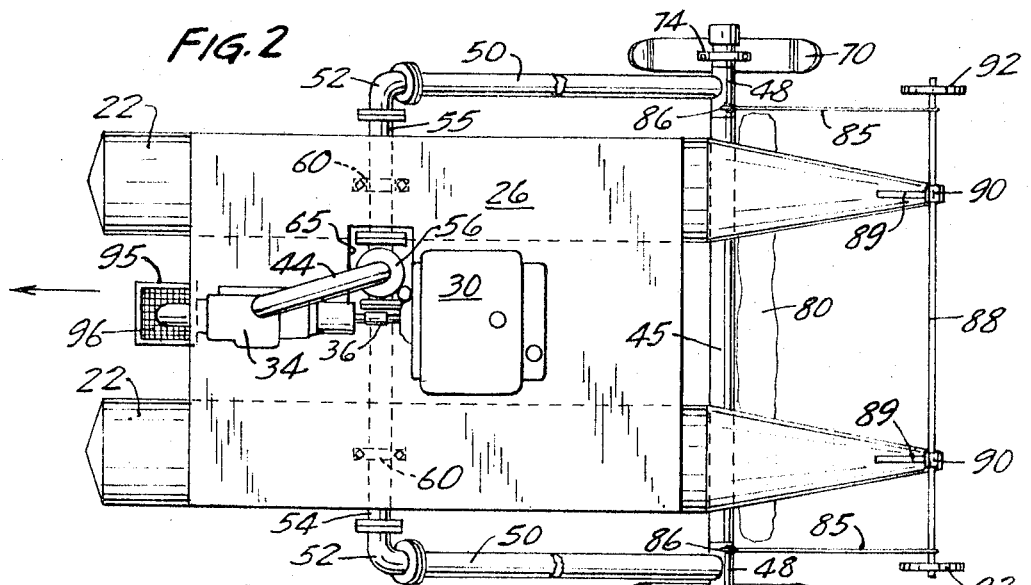
FIG. 2 is a plan view of the apparatus of FIG. 1.
Figure 3:
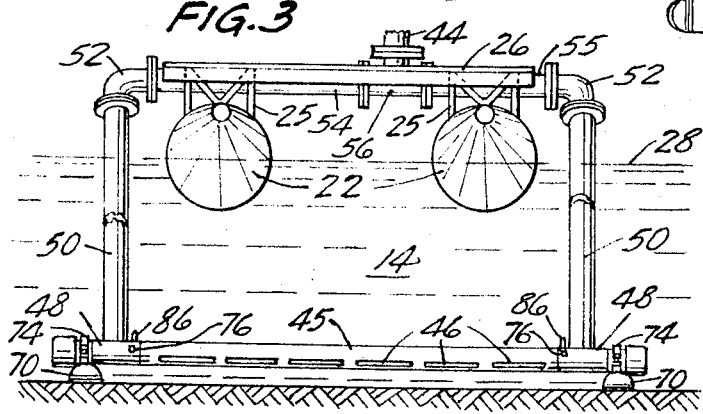
FIG. 3 is a front elevation view of the apparatus of FIG. 2 with parts broken away.

My improved apparatus for removing weeds from soil under water is shown in side elevation view in FIG. 1 and schematically with respect to a water body and a soil surface beneath the water body to indicate a condition of operation of the same. Thus, in FIG. 1, the apparatus or machine is indicated generally at 10 as floating on the surface of a body of water, indicated at 14, with a hydrojet portion of the apparatus, indicated generally at 15, in contact with a soil or ground surface 16 in which a plurality of weeds or other vegetation, indicated at 20, is growing for the purpose of removing weeds from the soil surface. The improved apparatus employs a floatable platform comprised of a pair of pontoon members 22 which are connected together through a suitable frame structure 25 having a platform surface 26 thereon. The float-type structure may take varying forms and will be a shallow-draft device such that it will ride relatively high on the waterline, such as is indicated by the waterline 28 for this water body 14 in FIG. 1.

The improved weeding apparatus includes a gasoline-engine-driven pump mounted on the platform 26, the gasoline engine being indicated at 30 and the pump at 32 with the suitable transmission 34 connected thereto and coupled to the gasoline engine as indicated at 36. The engine, transmission and pump are suitably secured to the platform to provide a high-pressure source of water for feeding the hydrojet assembly for the weeding operation as will be hereinafter defined. The pump body 32, which is of the reciprocating piston type, includes an inlet conduit 38 and an outlet conduit 40 leading to a throttling valve 42 with the output of the same being connected through a flexible pipe 44 to be connected to the jet tube assembly. The jet tube assembly 15 includes an elongated solid tubular member 45 having a plurality of elongated slots 46 therein aligned along the surface of the tube and with the axis of the same. The tubular member 45 is rotatably mounted in hollow sleeve-type mounting members 48 at the ends of the same. The sleeve-type mounting members have connected thereto transversely extending feedpipes 50 made of a rigid metal conduit for the purpose of supplying liquid or water under pressure to the elongated jet tube member 45 to be forced out through the slots 46 in a hydrojet action. The feedpipes 50 include elbow-type couplings 52 at the ends of the same and a pair of horizontal feedpipes 54, 55 which connect to a T-shaped coupling section 56 to which the extremity of the flexible tube 44 is connected. The horizontal feedpipes 54, 55, together with the T-shaped coupling section 56, provide an elongated pipe structure which is disposed parallel with the jet tube member 45 and defines a generally rectangular configuration with the feedpipes 50 of the jet tube assembly. These horizontal feedpipes are mounted to the platform 24 on the underside thereof through journal-type coupling members, indicated at 60, which permit rotative movement of the assembly of feedpipes 54, 55 and the coupling member 56 to cause pivoting of the entire jet assembly and arcuate movement of the jet tube member 45 which will be disposed beneath the platform and/or floats and generally horizontal or parallel with the surface thereof so as to be pivoted toward and away from one end of the float assembly. A suitable opening 65 in the top of the platform permits movement of the T-shaped coupling and the end of the flexible tubing to permit pivoting of the jet tube assembly relative to the platform while maintaining the sealed output connection with a pump. The jet tube assembly is pivoted relative to the platform to accommodate varying depths of water or distances between the platform and the soil surface in which the deweeding is to take place, as well as permitting pivoting of the jet tube assembly against the surface of the pontoons for transportation of the same.

The ends of the jet tube 45 mount a suitable pair of runners or ski-type glides 70 which are connected thereto through brackets 72 and suitable sleeve-type couplings 74 at the ends of the pipes or jet tube assembly. These space the jet tube from the ground and the tube itself is adjustable within the T-shaped coupling members 48 and secured thereto through setscrews 76 so that the openings 46 therein may be arcuately moved relatively to the ground to change the direction of spray of discharge of water under pressure therefrom. Thus, the supporting feedpipes 50 with the transversely extending support pipes 54, 55 and couplings form a solid structure which pivots and supports the jet tube assembly and positions the jet tube member 45 in any one of a number of angular positions relative to the platform for varying depth adjustment and for transportation purposes. This structure also provides the passage for water under pressure from the pump to be directed through the slots 46 in the jet tube assembly for the hydrojet action in weed removal. The slots being aligned and so spaced will direct a water spray on the soil surface to effect a complete line removal of soil or erosion of the same to bear the roots of weeds and other vegetation for the purpose of removing them from the soil. The weeds or growth being of lighter density than the water, will float to the surface and a groove or troughlike depressions, such as is indicated at 80 in FIG. 1, will occur. However, as the machine is moved forward, as indicated by the arrow 82 in FIG. 1 relative to the soil surface 16, the sand or soil removed from one trench row will fill the preceding or near adjacent area covered so that the soil surface will remain generally level with weed removal. The runners space the tube assembly from the soil surface a predetermined distance which will always be maintained so that the hydrojet action may be uniform and this mounting will compensate for variations in the soil surface.

Attached to the ends of the jet tube assembly is a suitable lift mechanism in the form of cables or ropes 85 which is attached at either end of the jet tube assembly or coupling members 48 through hooks, such as is indicated at 86, and with the cables extending to a windup rod 88 mounted on the ends of the pontoons through suitable raised brackets 89 and associated journal members 90. The ends of the windup rod 88 carry handgrip wheels 92 attached to the rod so that the rod may be rotated and the cables rolled on the rod to raise or lower the jet tube assembly relative to the floatable platform. The inlet of the pump, as evidenced by the pipe 38, extends to and below the waterline 26 terminating in a boxlike structure 95 with a suitable screened inlet 96 thereto so that weed-free water may be drawn into the pump.

In the operation of the weed-removing apparatus, the jet tube assembly or water jet tube member 45 will be raised through operation of the pivot mechanism by manipulation of the handwheels 92 to rotate the rollup rod 88 such that the jet tube assembly will be elevated to a position in contact with or closely adjacent the bottom surface of the floats 22. In this embodiment of the apparatus, no means is shown for propelling the apparatus and it will be understood that the operator of the same will push the platform in water from which weeds on the bottom are to be removed to position the machine in any desired position. If wind or wave action is shoreward, the apparatus is positioned near the shoreline and moved out to shallow waters such that as weeds are removed and float to the surface, they will be moved shoreward. When the machine is in a position for operation, the jet tube assembly is lowered so that the runners or skids 70 are in contact with the ground surface. If necessary, the elongated tube 45 may be angularly positioned in the end coupling members 48 by loosening of the setscrews 76 therein and manually rotating a tube until a desired angular relationship between the slots and the ground surface is obtained, after which the nuts will be tightened to maintain this angular position. With the jet tube assembly in contact with the beach bottom through release of the hoisting or pivoting assembly, the platform will be held in position by weight of the tube assembly. The pump motor would be started so that water would be pumped through the piping to the slotted jet tubes. Water will flow through the slotted openings at a high velocity displacing the sand or soil surface and with it the weeds and their root systems. All of the material with a density less than water will float to the surface and the sand will return to the bottom washed and hydraulically graded. The depth of the washing or jet action can be controlled by the time allowed for the water to be dispensed from the jet tube in a single position and the volume and velocity of the water coming from the pump. The volume and velocity of flow can be controlled by operation of the throttling valve 42 at the pump discharge. The operator will move the machine at a speed to obtain the desired weeding results. The platform will be moved in a direction away from the jetting actions so that the newly jetted sand will fill the furrow or groove created by the previous jetting action. In moving the apparatus, the jet tube is raised slightly by the wheel to eliminate frictional drag created by the jet assembly or the float assembly may be moved with the jet assembly in contact with the ground surface. By moving the apparatus forward along a direct line and covering an entire area, the weeds are removed and the sand is washed with the speed of movement being controlled by the operator and dependent upon the character of the weeds, sand, water pressure and velocity of flow from the jet tube assembly. Efficient weeding is obtained by covering the entire ground surface with a hydrojet discharge which covers a complete line to provide the furrow created by the jet action. This insures removal of all weeds from the bottom and complete release from the same so that they may be washed shoreward or collected depending upon wind direction and platform movement. The screened inlet to the pump insures against plugging of the same and the entire structure may be operated by a single operator to effectively remove growth and vegetation while at the same time improving the condition of the ground surface, that is normally the sand surface, to enhance value of lakeshore or shore property along waterways and in lakes. The machine will accommodate varying water depths by pivoting of the jet tube and its supporting structure on the platform so that the same spacing will be maintained between the ground surface and the jet tube for maximum and efficient cleaning.

In considering this invention, it should be remembered that the present disclosure is illustrative only and variations may be made within the scope of the invention in the form of the power source and pump, the supporting structure for the jet tube assembly and the design and shape of the floating platform. Therefore, I wish to be limited only by the appended claims.

What I claim is:

1. Apparatus for removing weeds from soil under water comprising:
   a. a floatable platform including a pair of pontoons connected together in spaced parallel relationship with a frame structure mounted thereon and extending therebetween;
   b. a jet tube assembly carried by said platform, said jet tube assembly including an elongated jet tube having a plurality of slotted jet openings therein spaced along the extent of the same and solid feeder pipes connected to the ends of the jet tube assembly;
   c. a gasoline-engine-driven pump mounted on said frame structure and having an inlet connected through a tubular conduit to a screened housing positioned on the platform such as to receive water from the water which is adapted to float the platform and an outlet connected through a flexible feeder pipe to the solid feeder pipes of the jet tube assembly;
   d. journal means pivotally mounting the jet tube assembly on the frame structure of the platform to pivot the jet tube toward and away from the platform;
   e. valve means positioned in the flexible feeder pipe of the outlet of the pump to vary the velocity and volume of water flow through the openings in the jet tube;
   f. elongated runner means positioned at the extremities of the jet tube and adapted to contact a soil surface beneath the source of water in which the floatable platform is positioned to space the elongated slotted jet tube from the soil surface;
   g. means included in the jet tube for adjustably positioning a portion of this tube having the slotted jet openings therein relative to the solid feeder pipe means and the elongated runner means to vary the angular relationship of the jet openings to the elongated runners and hence the angle at which water is discharged from the slotted jet openings relative to the soil surface; and
   h. cable means mounted on the floatable platform and connected to the jet tube assembly at the jet tube to elevate the jet tube assembly relative to the platform.